Patented Feb. 16, 1943

2,311,233

UNITED STATES PATENT OFFICE 2,311,233

MOLDING SYNTHETIC RESINS

Johannes Jaenicke, Herbert Knoop, Hermann Miedel, and Otto Schweitzer, Frankfort-on-the-Main, Germany, assignors to American Lurgi Corporation, New York, N. Y., a corporation of New York No Drawing. Application January 19, 1939, Serial No. 251,834. In Germany January 25, 1938

7 Claims. (Cl. 260—41)

The present invention relates to a process of molding synthetic resins. With this process, synthetic resins can be molded into many forms, for example, into plates, tubes, receptacles, floors, wall coverings, substructures or bases for machines, road surfaces, joint packings, and the like.

Molded articles are ordinarily made from synthetic resins by pressure. This method, however, requires accurately machined and expensive apparatus, and is limited in the number of forms which can be produced. Molded synthetic resin structures have also been produced from solutions of the synthetic resins in organic solvents, by coating molds with a film of the solution and evaporating the solvent, and repeating this step until a sufficient resin thickness is obtained. Organic solvents commonly used are disadvantageous because of the danger of fire, and the injurious effect of the solvent fumes on the operator's health. Although aqueous dispersions of the resin have been used in place of organic solvents and have the advantage of permitting substantially higher concentrations of synthetic resin, they require an extremely great length of time for the evaporation of the water when allowed to set or harden through evaporation alone.

It is an object of the invention to make mixes of aqueous dispersions of synthetic resins and mortar forming substances to form a gel which is moldable before solidification.

Another object of the invention is to mold and solidify a mixture of a synthetic resin, cement, and water, with the evaporation of very little water, solidification taking place in a relatively short time.

Another object of the invention is to produce various compositions of synthetic resins, cement, and water which are easily moldable, and upon hardening, having individual structural characteristics.

Another object of the invention is to create a method of molding aqueous dispersions of synthetic resins so that solidification and hardening is obtained quickly and without the evaporation of a considerable amount of water.

It is the discovery of the instant invention that molded synthetic resin articles or forms can be rapidly, reliably, and permanently produced by molding aqueous dispersions of synthetic resins, or mixtures thereof, or mixtures of different synthetic resin dispersions, in admixture with hydraulic setting mortar forming materials, for example, hydraulic cement. The quantity of said mortar forming material and that of the water present in the mixture are adjusted so that the mixture, by reason of the water combining and the coagulation of the multi-valent cations passed into solution by the mortar forming material, is solidified, with no, or inappreciable, evaporation of the water, to a stable gel from which the excess water can be subsequently evaporated. By adjusting the proportions to the mortar forming material to that of the water in the mixture, it is possible to regulate the time of the solidifying period within wide limits, and according to prevailing requirements, because an increase of the mortar forming content increases the rate of solidification.

An important advantage of the process arises by reason of the extremely great difference in the properties of known synthetic resins, and the possibility of mixing different synthetic resins, so that the physical and chemical properties of the products, for example, their hardness, and their resistance to the action of corrosion, oil and temperature, can be varied with wide limits and regulated as desired. In addition, admixture can be made with different kinds of fillers of mineral, vegetable, or animal origin, for example, cork powder, asbestos powder or fibre, vegetable fibre, kaolin, quartz powder, synthetic resin powder, sawdust, and hair or wool fibres. The properties of the mixtures thus may be varied, and further variations in the properties of the product can be obtained by the admixture of other materials, for example, by the addition of a softening agent or mixtures of softening agents for synthetic resins. By suitably selecting the constituent materials and their proportions, mixtures can be produced which, with respect to their properties, are regulatable within wide limits. Mixtures having great adhesive capacity for smooth surfaces, for example, those of metal, can be produced by placing a high cement content in the mixture, or by using synthetic resins of specific adhesive properties with respect to the surface, and form excellent coatings.

By incorporating pieces or fragments of colored, or varied colored, substances, for example, of glass, porcelain, or stone, in the cementitious synthetic resin masses, ornamental effects can be obtained which are excellently suitable for flooring. By the introduction of elastic pieces or fragments of differently colored pieces of rubber elastic, flexible decorative articles can be produced.

The selection of the synthetic resins or mixtures thereof depends on the properties desired. Substances utilizable for the process are: preparations of polyvinyl esters, as Vinnapas, Mowilith; other polyvinyl derivatives as polystyrol, polyvinyl chloride, for example, Igelit, or polyvinyl mixed polymerisation products; also preparations of acrylic ester polymerisation products as Aeronal, or Plexigum; mixed polymerisation products of acrylic compounds, or of polyisobutylene; thioplasts, as condensation products of organic dihalogenides, for example, beta-beta-dichlordiethyl ether with alkali polysulfide, such as sodium tetrasulfide.

If necessary, the properties of these or similar substances can be given elastic, or similar properties for a desired purpose, by means of softening agents such as phthalic acid butyl ester, tricresyl phosphate, triacetine, butyl stearate, dibutyl phthalate.

Premature coagulation of the dispersions in the mortar forming material, or cement, or too rapid setting of the latter is precluded by the addition of known protective substances, for example, protective colloids. The dispersions may also contain other additions, such as pigments and cellulose derivatives.

As mortar forming substances, use can be made of the different hydraulic cements, such as alumina cement, Portland cement, trass, pozzuolana, and calcined gypsum.

The mixtures can be molded or formed in the usual manner, as by applying with a trowel and spatula, painting, pressing, or spraying. The latter is particularly suitable for covering, or coating large, particularly non-horizontal, surfaces.

The mixtures can be converted into a foamy or frothy state by incorporating a gas-evolving substance, as $H_2O_2$, before solidification, thus producing porous products which are suitable for heat and sound insulation.

The following are practical examples of mixtures which may be employed to achieve various objects of the invention.

1. A mixture of the following composition will produce synthetic resin plates suitable for abrading or wearing purposes, as a floor covering:

| | Parts |
|---|---|
| Polyacrylic acid ethyl ester aqueous emulsion, 55% | 100 |
| Quartz powder | 125 |
| Alumina cement | 5 |

The individual constituents are intimately mixed immediately before preparation. The resulting well homogenized, paste-like mass is introduced into suitable molds. After setting and drying, the plates are finished and can be placed in use.

Instead of the polyacrylic acid ethyl ester, use can also be made of the methyl ester, or a mixture of both esters.

2. A mixture of the following composition is suitable for receptacles, or other bodies having walls or sides:

| | Parts |
|---|---|
| Polyacrylic ester emulsion, 50% | 50 |
| Polyvinyl acetate emulsion, 50%, with about 5% softener | 50 |
| Quartz powder | 140 |
| Cement | 20 |
| Water, approximately | 10 |

Shortly before the preparation, the mineral constituents are combined with the mixture of the two emulsions and carefully distributed uniformly therein. The paste-like mass is applied by means of a spatula or trowel upon a fine mesh wire netting corresponding to the form of the receptacle to be made, is allowed to set thereon, is dried, and then the inner side of the receptacle is lined with ceramic plates.

3. A tube or pipe is made of the following mix:

| | Parts |
|---|---|
| 30% aqueous emulsion of a mixed polymerisation product composed of about 80% vinyl acetate and 20% vinyl chloride, and known under the commercial name of Mipolam | 100 |
| Quartz powder | 155 |
| Alumina cement | 43 |
| Water | 10 |

The inorganic constituents are carefully mixed with the aqueous emulsion immediately before preparation.

A framework for the tube is made of light wire fabric, the seam or connection of the flange with the cylindrical part being easily made by lacing with a wire. The above mixture is applied on the wire fabric by means of a trowel or spatula. After forming a gel and drying the mixture, a durable tube is obtained which, if desired, can be provided with an interior rubber lining.

4. The following mixture can be used for covering seams created in the formation of receptacles:

| | Parts |
|---|---|
| Polyvinyl acetate emulsion 50% with a 4% softener content | 50 |
| Emulsion of a reaction product of hydrocarbon halogenides and alkali polysulfides, known as Thiokol | 40 |
| Quartz powder | 160 |
| Alumina cement | 40 |

The inorganic constituents are added to the mixture of the two emulsions immediately before preparation.

5. A mixture of the following composition is suitable for laying parquet flooring, linoleum, etc.:

| | Parts |
|---|---|
| Polyacrylic ester emulsion T. S. 55% | 30 |
| Polyvinyl ester emulsion T. S. 50% with about 3% softener | 70 |
| Ammonia solution | 2 |
| Water, approximately | 10 |
| Quartz powder | 80 |
| Alumina cement | 20 |

The mineral constituents are added immediately before preparation. The carefully homogenized, paste-like mass can be applied with a spatula or trowel.

The examples show, in each instance, the mixing of a synthetic resin with cement, water, and a filler, the resulting mix being troweled on a supporting surface where it gels, and sets with the evaporation of very little water, and in a relatively short time. If sufficient water does not exist in the aqueous synthetic dispersion, more can be added as illustrated in Examples 2, 3 and 5. In the various examples the proportions given differ for the various types of structures formed, it being understood that the proportions can be varied, and equivalent ingredients used, in each individual example to emphasize various physical properties, as strength, hardness, and flexibility in that example.

Having now described means by which the ob- jects of this invention may be obtained, what we claim is:

1. A moldable composition comprising an aqueous dispersion of a synthetic resinous polymerization product and a minor proportion, with respect to said resinous product, of a hydraulic cementitious material intimately mixed to form a gel-like composition.

2. A composition as in claim 1, in which said resinous product consists of a polyvinyl resin.

3. A composition as in claim 1, in which said resin consists of a polyacrylic resinous product.

4. A moldable composition comprising an aqueous dispersion of a synthetic resinous polymerization product proportionately and intimately mixed with a minor proportion, with respect to said resinous product, of hydraulic cement, and a filler to form a gel-like composition with substantially no evaporation of water.

5. A composition suitable for a floor covering consisting of 100 parts polyacrylic acid ethyl ester water emulsion, 55%, 125 parts quartz powder, and 5 parts alumina cement.

6. A composition suitable for a pipe consisting of 100 parts of a 30% aqueous emulsion of a mixed polymerisation product composed of about 80% vinyl acetate and 20% vinyl chloride, 155 parts quartz powder, 43 parts alumina cement, and 10 parts water.

7. An adhesive composition consisting of 30 parts polyacrylic ester emulsion T. S. 55%, 70 parts polyvinyl ester emulsion T. S. 50%, with about 3% softener, 2 parts ammonia solution, 10 parts water, approximately, 80 parts quartz powder, 20 parts alumina cement.

JOHANNES JAENICKE.
HERBERT KNOOP.
HERMANN MIEDEL.
OTTO SCHWEITZER.